Feb. 13, 1951          C. W. MUSSER          2,541,087
SAFETY DEVICE FOR CATAPULTING PASSENGERS FROM AIRCRAFT
Filed Oct. 25, 1949          2 Sheets-Sheet 1
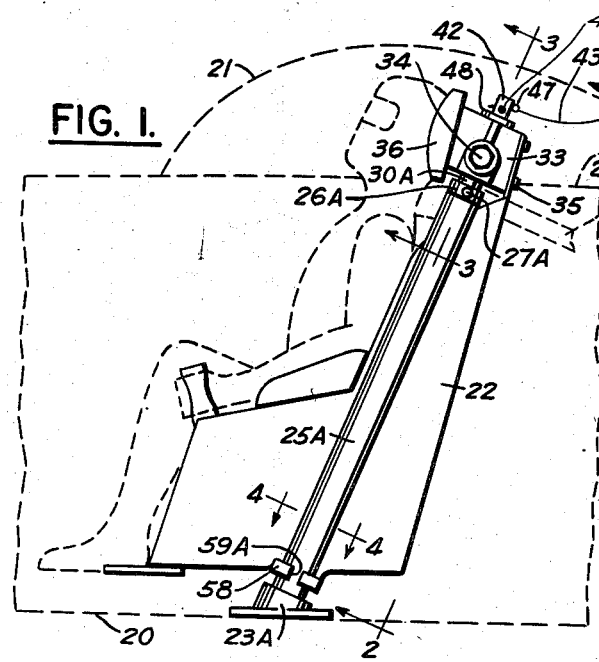
FIG. 1.
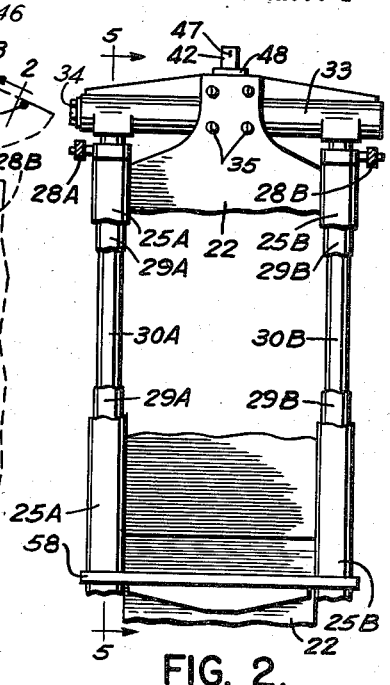
FIG. 2.
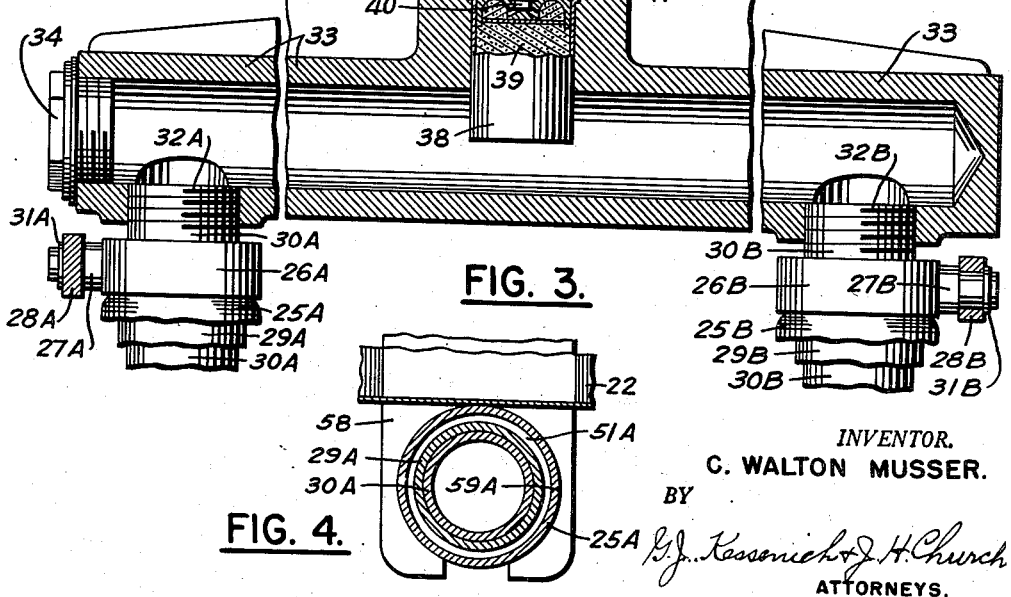
FIG. 3.
FIG. 4.
INVENTOR.
C. WALTON MUSSER.
BY
*G. J. Kessenich & J. H. Church*
ATTORNEYS.

Feb. 13, 1951     C. W. MUSSER     2,541,087
SAFETY DEVICE FOR CATAPULTING PASSENGERS FROM AIRCRAFT
Filed Oct. 25, 1949     2 Sheets-Sheet 2
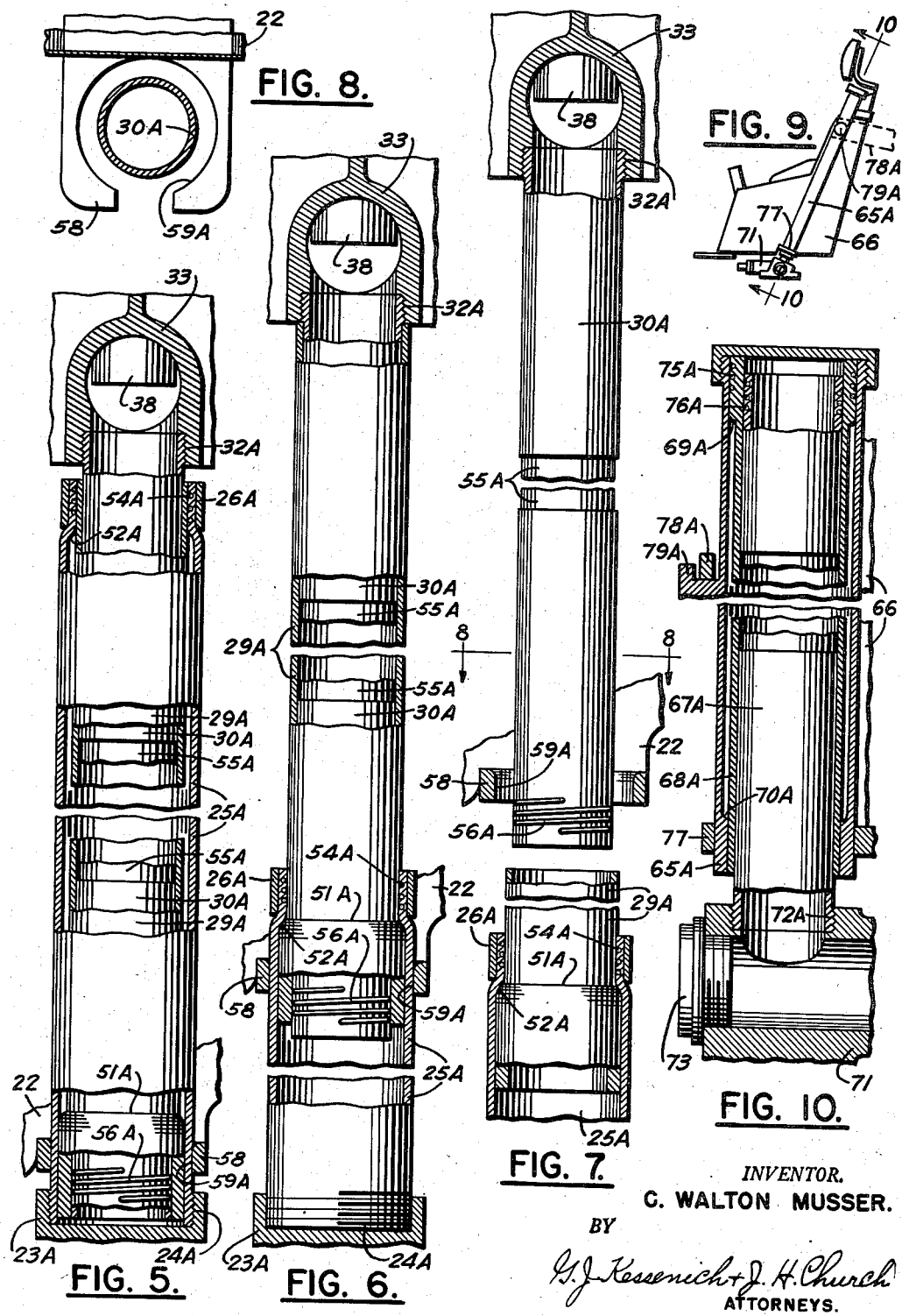
INVENTOR.
C. WALTON MUSSER.
BY
G. J. Kessenich + J. H. Church
ATTORNEYS.

Patented Feb. 13, 1951

2,541,087

UNITED STATES PATENT OFFICE 2,541,087

SAFETY DEVICE FOR CATAPULTING PASSENGERS FROM AIRCRAFT

Clarence Walton Musser, Glenside, Pa.

Application October 25, 1949, Serial No. 123,491

16 Claims. (Cl. 244—122)

(Granted under the act of March 3, 1883, as amended April 30, 1928; 370 O. G. 757)

The invention described herein may be manufactured and used by or for the Government for governmental purposes without the payment of any royalty thereon.

This invention relates to safety devices for enabling rapid exit from an aircraft of any of its occupants, and has particular reference to an explosive propellant-powered catapult for safely ejecting such occupants, together with the chair upon which each is seated, and enabling them to parachute safely to the ground.

Broadly stated, the object of the present invention is to provide an improved expansible chamber gun type of pilot ejector in which the ejection force is exerted substantially through the center of gravity of the mass being ejected.

A more specific object is to provide means for minimizing the tendency towards overturning caused by prior art upward-ejection pilot catapults, and thereby decrease friction, increase efficiency, and decrease the weight of structures required to withstand the overturning forces.

Another object is to provide a considerable saving in weight over comparable prior art devices by utilizing the pilot seat side frames as part of the ejection mechanism and guide rails therefor.

Still another object is to effect a saving of space required for installation and effective operation of the life-saving catapult.

One more object is to effect a more gradual initial acceleration of the seat catapult than heretofore was possible by a more advantageous distribution and application of the ejecting force.

Other objects will be apparent from the following detailed description, and the accompanying drawings, in which:

Fig. 1 shows in side elevation my novel catapult device as same is positioned with respect to an airplane and passenger, the latter two being partially shown in outline;

Fig. 2 is a view taken from line 2—2 of Fig. 1 and partially torn away to show the tube forming the side frame of the seat and their concentric arrangement which forms two expansible gas chambers;

Fig. 3 is a longitudinal cross section on line 3—3 of Fig. 1 showing the manifold and bilateral tube construction of the ejection device;

Fig. 4 is a transverse section on line 4—4 of Fig. 1 showing the ejection device's concentric tubes and the seat-attached supporting brace therefor;

Fig. 5 is a longitudinal cross section taken along line 5—5 of Fig. 2 to show the relationship of the concentric tubes in the collapsed, or normal inoperative condition;

Fig. 6 is a view similar to Fig. 5 except that the intermediate of the three concentric tubes is shown fully extended;

Fig. 7 is a view similar to Figs. 5—6 except that the extension of the tubes has proceeded to the point where the innermost tube which is attached to the seat, has been separated from the other tubes which are secured to the aircraft fuselage;

Fig. 8 is a transverse section on line 8—8 of Fig. 7 showing the relationship of the tube supporting brace to one of the paired innermost tubes whereby those tubes are restricted in their lateral movements relative to the pilot's seat after ejection from the aircraft;

Fig. 9 is a side elevation showing of an alternative construction of the present invention; and Fig. 10 is a longitudinal section on line 10—10 of Fig. 9 showing the interior relationships of an alternate form of the invention.

Although for sake of convenience reference to the present invention is herein made as being applicable to a pilot ejection catapult, it should be clear that the device is equally applicable to any passenger in practically any type of aircraft, although, of course, at present the device has its widest application in high speed racing or fighter type aeroplanes from which it is exceedingly difficult if not impossible for occupants to bail out safely by their own unaided efforts.

Two embodiments of the present invention are shown in the drawings. Both relate to a prime mover, motor or gun in which an explosion moves a piston along a cylinder consisting of two or more telescoping tubes. The preferred form, shown in Figs. 1–8, has a cartridge and firing mechanism therefor mounted in a manifold located at the head or top of the pilot's seat. The manifold has two spaced openings leading therefrom, each of which is fitted to corresponding tubes which form the innermost members of a pair of parallel concentric tubes. These concentric tubes act as a supporting frame for the seat in the aircraft, the innermost being attached to the seat by way of the manifold, the remaining tubes are secured to the fuselage. When the firing mechanism is actuated to detonate the cartridge, the gas which develops fills the tubes on both sides of the seat and, through rapid expansion, forces the innermost of the tubes, with the seat attached thereto, upward and out of the aircraft.

The alternative form of the invention illustrated in Figs. 9–10 has its cartridge and firing mechanism therefor mounted in a manifold secured to the aircraft beneath the pilot's chair or seat. This manifold likewise has two spaced openings each fitted on to the corresponding tubes which form the innermost members of a pair of parallel concentric tubes. These concentric tubes similarly act as a supporting frame for the seat in the aircraft, the outermost and the intermediate of said tubes being secured to the seat, while the remaining innermost tubes are attached to the fuselage. When the firing mechanism is actuated to detonate the cartridge, the gas which develops fills the tubes on both sides of the seat and, through rapid expansion, forces the outermost tubes with the seat and intermediate tubes attached thereto, upward and out of the aircraft.

Referring now to the drawings, and in particular Figs. 1 to 8 thereof, Fig. 1 shows an aircraft 20 having a canopy or other cockpit housing 21 overlying the cockpit or part of the fuselage normally occupied by the passenger in the aircraft. In this cockpit is a chair or seat 22 on which the aviator sits, the chair being supported at any desired distance from the floor of the aircraft by an adjustable means which also serves to prevent the seat from becoming displaced when the aircraft is inverted. (This adjustable means is conventional and could be of many different designs, and for the sake of simplicity has not been shown.) When the cartridge is fired and the gaseous driving force developed, the restraining force normally supplied by said means is overcome or unlatched and the ejection of the seat from the aircraft then takes place.

In describing the remaining parts of the present invention, certain members (particularly in the concentric series of tubes) which are essentially duplicate but on opposite sides of seat 22 will be referred to by employing similar reference characters except for designating those on the pilot's left side by the letter A, and those on the pilot's right side by the letter B. In order to conserve space in the drawings, not all of these duplicate parts will be shown, particularly those illustrating the internal constructions of the tubes. However, to assure a clear understanding of which parts are duplicated, reference will be made to the parts that are present on both sides of the pilot's seat although in many instances only the members on the pilot's left will appear in the drawing views.

Securely attached to the floor of the aircraft on both sides of seat 22 are brackets 23A—23B. Mounted in each of these brackets, as by threads 24A—24B (see Fig. 5), are the outermost tubes 25A—25B of a paired concentric series. The opposite or upper ends of tubes 25A—25B terminate in rings 26A—26B which are respectively secured to the tubes by press-fit, brazing or other suitable means. Extending laterally from these rings are trunnions 27A—27B to which are attached one end of corresponding supporting means 28A—28B which cooperate with brackets 23A—23B to keep the concentric series of tubes rigidly in place. Fastening of those supporting means onto the trunnions is accomplished by simple snap fasteners 31A—31B, respectively. The ends of supporting means 28A—28B not attached to the trunnions are secured by any conventional means (not shown) to the rear of the cockpit or other portion of the aircraft fuselage.

Concentrically contained within each of tubes 25A—25B are any desired additional number of tubes; in the drawings there are two, 29A—29B and 30A—30B, respectively, the former being intermediately placed, while the latter are the innermost of the series. The concentric tubes are in a piston-cylinder relationship. In fact, instead of using a tube for the innermost member of the concentric series, a solid piston may be substituted. As will become clear from the detailed description which follows the innermost tubes 30A—30B are free at their lower ends but are indirectly secured at their upper ends to the seat 22 and so are ejected therewith from the aircraft by catapult action; the intermediate tubes 29A—29B, however, remain in the aircraft for they are slidably secured to the outermost tubes which are in turn fastened to the aircraft fuselage.

The uppermost extremities of innermost tubes 30A—30B are threaded as at 32A—32B for ready attachment to a manifold 33 (see Figs. 1—2—3). This manifold may take the simple T-shaped form shown in Fig. 3, and thus can easily be made by conventional metal forming processes whereby the illustrated holes at right angles to each other are conveniently provided. One of these holes can be capped with a threaded plug 34; the other is provided to house an explosive cartridge and firing mechanism therefor as will later be explained. Other forms of the manifold are, of course, possible. Or, if desired, the manifold per se may be dispensed with by joining innermost tubes 30A—30B together (not shown), and housing at this point of confluence the cartridge and firing mechanism.

Whether tubes 30A—30B are joined together directly or by means of a manifold, it is of course necessary for the purposes of the present invention to secure the tubes to seat 22 as the seat and the said tubes are intended to be ejected together from the aircraft. In the illustrated design of Figs. 1—8 the rear of manifold 33 is bolted to the upright back portion of seat 22 by means of screws 35. The manifold 33 may also serve as a convenient mounting for the pilot's head rest 36 which may be secured thereto by any conventional means (not shown).

Referring now to the cartridge and firing mechanism therefor mounted in the manifold, there will be seen (in Fig. 3) a conventional type of cartridge 38 having a thin-walled case containing a propellant powder 39, a primer 40, and a detonating pin 41. This cartridge is placed so that when exploded the gases issuing therefrom will spread rapidly through the manifold and expand into the innermost tubes 30A—30B. Above, but in flush contact with the cartridge, is the firing mechanism housing 42. Contained within this housing is a spring 44-loaded hammer 45. Cocking of the illustrated hammer may be accomplished before mounting it in the manifold by simply forcing the hammer back to compress spring 44, and securing the hammer in that position by inserting cotter type pins in holes provided therefor. Two such pins may preferably be employed: one (not shown) is used to fill opening 46 (see Figs. 1, 3) and is employed as a safety device, being removed before the aircraft takes off in flight; the other pin 47 is attached by any suitable means, such as a lanyard 43, to canopy 21 so that when the canopy is thrown off this pin is removed and the hammer is released under its spring pressure. Serving to secure the firing mechanism and cartridge in the opening provided therefor is a ring-shaped cap 48 which encircles housing 42 and threads into the manifold as indicated at 49.

Following is a detailed description of the construction of concentric tubes 25A—25B, 29A—29B, 30A—30B. These tubes are fitted together in a sort of piston-cylinder relationship, so that when filled with powder gas upon explosion of cartridge 38 the intermediate tubes 29A—29B and the innermost tubes 30A—30B will extend upwardly like an expanding telescope. As abovesaid, outermost tubes 25A—25B are secured at their lower ends by threads 24A—24B to brackets 23A—23B. The intermediate tubes 29A—29B are free to travel upwardly until only a small portion of their lower extremities remain in bearing surface relationship within the outermost tubes, being there restrained against further upward movement by virtue of a shoulder 51A—51B on the outer wall of the intermediate tubes locking with a corresponding shoulder 52A—52B on the inner wall of the outermost tubes. In order to prevent leakage of the powder gases past the portions of the outermost and intermediate tubes which remain in bearing relationship, there are provided unique helically shaped piston rings 54A—54B (see Fig. 5). These rings preferably may be formed from spring steel wire, and are made to fill matching grooves provided therefor on the inner wall of the outermost tubes. To prevent the rings from getting out of position in the matching grooves provided, a hole (not shown) extending radially into the tube's wall is provided at one end of the grooves, and one end of the rings is fitted thereinto.

The innermost tubes 30A—30B are, as abovesaid, secured at their upper ends to manifold 33, but their lower extremities are unrestricted so that they are free to be catapulted from the aircraft along with the seat 22 and the manifold attached thereto. Fig. 7 shows innermost tube 30A just after it has left intermediate tube 29A and outermost tube 25A which remain behind in the aircraft.

As Fig. 7 illustrates, the outer wall of the innermost tubes can conveniently be provided with stepped down recesses 55A—55B which give relief from frictional forces and make easier exit of those tubes from the corresponding intermediate tubes. The lower extremities of the innermost tubes are provided with novel gas-sealing helically shaped piston rings 56A—56B. These rings, just like the abovesaid rings 54A—54B, preferably may be formed from spring steel wire, and are made to fill matching grooves provided therefor on the outer walls of the innermost tubes. Holes (not shown) extending radially into the tubes' walls are provided at one end of the grooves, and one end of each ring is fitted thereinto so as to prevent the rings from getting out of position in the matching grooves. Use of these piston rings assures that none of the powder gases developed upon detonation of cartridge 33 will leak out between the innermost and intermediate tubes until after the innermost tube has been forced out of the concentric tube series and out of the aircraft.

For guidance of the pilot seat 22 during ejection there is provided a rectangular plate 58 extending transversely and secured to the bottom of seat 22 so that each end of the plate mates with the corresponding outermost tube 25A—25B. This plate 58 also serves to prevent injury to the seat's occupant that might be caused by movement of the innermost tubes, which leave the aircraft together with the seat, in different directions relative to each other and to the seat. Plate 58 has at each end an incomplete circular opening 59A—59B, respectively, which partially encircle the corresponding outermost tubes 25A—25B and coact with those tubes to prevent the seat from moving in any direction other than up or down along tubes 25A—25B and, upon later extension, along intermediate tubes 29A—29B. By this means the seat is guided in its travel along the full length of the tubes extending from the aircraft, and no extra guide rails or other means are necessary, thereby diminishing a considerable amount of the aircraft's total weight in comparison with aircraft equipped with prior art escape devices.

When the seat is installed in the aircraft, openings 59A—59B are fitted so as to encircle outermost tubes 25A—25B, respectively, and the seat then lowered to the Fig. 1 position, supported from the floor of aircraft 20 by vertical adjusting means (not shown). The notched or incomplete portions of circular openings 59A—59B make it possible to have plate 58 pass by the projecting trunnions 27A—27B when the seat is so installed and also when the seat is catapulted upward and out of the aircraft. As the foregoing description will have made clear, the construction is such that constant alignment of those notched portions with the trunnions is assured without the need for ribbed tracks, runners or other special guiding means. When the seat, manifold and the innermost tubes have been ejected and are falling through the atmosphere, plate 58 limits lateral movement of the tubes to the small surrounding space in openings 59A—59B (see Fig. 8).

From the foregoing detailed description of the preferred form of my invention it will be quite evident how my device functions and therefore only a simple explanation of its operation will be necessary. However, before discussing its operation, it is desirable to note two important ways in which my novel device has deviated from conventional practice. In the first place, instead of employing a single expansible chamber "gun" attached to the rear or beneath the base of the pilot's chair as in the prior art, there has been introduced an essentially bifurcated expansible chamber gun which is far more efficient than prior art devices and also acts as the side frames for supporting the pilot's chair, thereby eliminating the need for extra guide rails and chair supporting means. Secondly, the bifurcated gun tubes are so disposed with respect to the pilot seat held therebetween that the upward thrust supplied by the powder gases is exerted substantially through the center of gravity of the combined mass represented by the pilot seat and its occupant, this representing a considerable improvement over prior art methods which applied the ejection force at some distance from that center of gravity and thereby caused a distinct overturning action with consequent added friction and decreased ejection efficiency.

Operation of my novel pilot ejection device, as represented by the form illustratively shown in Figs. 1–8 inclusive, is as follows. The pilot disengages the fastenings (not shown) and slides back canopy 21 or removes it in any other conventional manner so that it may be caught in the wind slip stream and yanked off the aircraft. In so doing, lanyard 43 (Fig. 1) attached to the canopy on one end and at the other end to pin 47 is given a tugging force which removes the pin from housing 42. Immediately, the spring 44-stressed hammer 45 moves down to strike detonating pin 41, thereby setting off primer 40 and in turn propellent powder 39. Ignition of the propellent powder causes thin walled cartridge 38 to burst and the powder gases to pour forth therefrom and rush through manifold 33 down through innermost tubes 30A—30B. There, rapid expansion of the gases causes simultaneous extension of the intermediate and innermost tubes which are telescoped within the stationary outermost tubes, the intermediate tubes extending upwards until stopped by contact of its shoulder 51A—51B, respectively, with corresponding shoulders 52A—52B on the outermost tubes. The innermost tubes, being unrestricted and not attached to the aircraft, are catapulted upward and out of the aircraft along with the manifold 33 and seat 22 attached thereto. Such catapulting throws the seat and its occupant clear of the aircraft a distance which can be regulated by the use in cartridge 38 of a propellent powder charge which will give the required "kick."

To those familiar with the art there will be suggested other forms of catapult devices which will embody my invention. One such modification is, for illustrative purposes, shown in Figs. 9–10. The principal new feature of that design is that the outermost tubes 65A—65B are secured to the ejection seat 66, while the innermost tubes 67A—67B are secured to the floor of the aircraft, and the intermediate tubes 68—68B are adapted to be extended upward when pulled through contact of shoulders 69A—69B on its outer wall with mating shoulders 70A—70B on the inner wall of outermost tubes 65A—65B, respectively. Thus, in the modified design, the outermost and intermediate tubes leave the aircraft when seat 66 is catapulted therefrom.

The modified version also employs a manifold 71, to which innermost tubes 67A—67B are attached by threads 72A—72B, respectively. Manifold 71 (Fig. 10) may be similar to manifold 33 even to having a threaded plug 73 similar to plug 34 (Fig. 3), but the prime difference in the illustrated forms is that the Fig. 10 construction features the manifold at the floor of the aircraft beneath seat 66 rather than at the top as in the preferred showing.

Aside from the described variations, the internal construction of the Fig. 10 device is similar to that of the apparatus represented in Figs. 5—6—7. Helical piston rings 75A—75B are provided in corresponding grooves encircling the outer wall of intermediate tubes 68A—68B for preventing leakage of gases between those tubes and the surrounding outermost tubes. Similarly, helical piston rings 76A—76B are provided in corresponding grooves encircling the outer wall of innermost tubes 67A—67B for preventing leakage of gases between those tubes and the surrounding intermediate tubes until full extension and ultimate separation of the telescoped tubes has taken place.

In the device of Figs. 9–10 a heavy supporting plate 77 extends across the bottom of seat 66 and is attached at each end to the corresponding tubes 65A—65B. In addition, the tubes themselves are attached as by brazing, to the sides of the seat (see Fig. 1). Thus, when by force of gas pressure from propellent powder (not shown) the concentric tubes are made to extend, the connection of the tubes and the plate with the seat makes it possible for the seat to be catapulted from the aircraft.

In this modified device there are means (not shown) for adjusting the height of seat 66 from the floor of the aircraft. Readily disengageable supporting means 78A—78B are also provided for restraining the seat against movement forward, rearward, or even in the direction of the canopy in case the aircraft becomes inverted in flight. These supporting means 78A—78B may be of any convenient design as, for example, the locking claw-shaped bracket used on conventional extension ladders to secure the ladders at different positions. Appropriate recessed projections 79A—79B are provided on the sides of the corresponding tubes 65A—65B for engaging one end of supporting means 78A—78B; the other end of each support is attached to the aircraft fuselage.

From the foregoing description and from the drawings it will be clear to those familiar with the art that all of the aforesaid objects of my invention have been accomplished together with all the obvious advantages attendant thereto. By providing the bifurcated expansible chamber it has been possible to apply the ejection force, with greater efficiency than heretofore, substantially through the center of gravity of the ejected mass and thereby eliminate the overturning action with subsequent added friction and lowered efficiency caused by prior art pilot ejection devices.

The bifurcated chamber also makes it possible to divide the required amount of gaseous ejection force between two columns of tubes, rather than the conventional single column, and thus a maximum force is capable of being employed in a much smaller vertical distance than in conventional designs. In addition, the ejection can be made with the present invention at a greater angle than with prior art devices. These two improvements have made it possible to dispense with elongation of conventional cockpits, and also to retain the aircraft's windshields or canopies in their normal, prior art positions. This is a decided advantage over prior art expansible gun type of pilot ejection devices which have necessitated considerable modifications to normal aircraft design in order to install the safety mechanisms.

Still another advantage of the bifurcated chamber which should be obvious is the fact that division of the catapulting force into two parts acting on both sides of the mass to be ejected has made possible a more gradual initial acceleration than heretofore was possible. At the same time, incorporation of the expansible chamber mechanism into the frame of the pilot's seat has made it possible to eliminate side rails and guides, and thus considerably lighten the aircraft.

Although only two forms of the present invention have been shown and described, it will be perfectly obvious to those skilled in the art that still other modifications may be made without departing from the spirit and intent of my novel development. My invention is therefore extensive in its adaption and is not to be restricted to the specific forms here shown by way of illustration.

I claim:

1. In an ejecting device for the safe removal of personnel from an aircraft; a chair; a supporting frame therefor comprising two hollow cylinders each attached to the aircraft fuselage on opposite sides of said chair; a pair of pistons each slidably mounted in a corresponding one of said cylinders; a manifold, to which said pistons are joined, attached to the top of the chair; and an explosive charge located in said manifold and arranged to furnish the ejecting force when exploded.

2. In an ejecting device for the safe removal of personnel from an aircraft; a chair; a supporting frame therefor comprising two hollow cylinders each attached to opposite sides of said chair; a pair of pistons each slidably mounted in a corresponding one of said cylinders; a manifold, to which said pistons are joined, attached to the aircraft fuselage at the base of the chair; and an explosive charge located in said manifold and arranged to furnish the ejecting force when exploded.

3. In an expansible chamber gun type of safety ejector for occupants of aircraft, a chair, a bifurcated telescoped chamber framing said chair, and explosive means located in said chamber and arranged so that when exploded it furnishes the force required to eject from the aircraft said chair and any occupant thereof.

4. In an expansible chamber gun type of safety ejector for occupants of aircraft, a chair, a chamber divided into two portions which so frame said chair on opposite sides thereof that the plane passing through the central axes of both chamber portions will pass through the approximate center of gravity of the chair and its occupant, and an explosive charge located in said chamber and arranged to furnish the force required to eject the chair and its occupant from the aircraft.

5. In a catapult for safety ejecting a passenger from an aircraft, a chamber divided into two portions each open at one end, and a pair of pistons each mounted in one of the two chamber portions so as to be expelled from their open ends by an explosion in said chamber.

6. In an expansible chamber gun type of safety ejector for occupants of aircraft, a support for a passenger in said aircraft, a manifold mounted on said support, a pair of elongated hollow projectiles one on either side of said support and joined with said manifold, a pair of inner gun barrels each slidably surrounding a corresponding one of said projectiles and having transversely enlarged portions at their ends furthest from said support, a pair of outer gun barrels slidably surrounding said inner gun barrels and each having a closed breech at its end furthest from said support and having a transversely reduced portion arranged for engagement with the enlarged portions of said inner gun barrels when said inner gun barrels are in axially extended position, means attached to said outer gun barrels and to said aircraft for maintaining those gun barrels in such a position that the single plane which passes through the longitudinal axis of both barrels will likewise pass through the substantial center of gravity of the support and passenger thereon, and an explosive charge contained within said manifold and adapted, upon explosion, to move said gun barrels into axially extended interengaging position and to expel said projectile from said gun barrels and to carry away the manifold and support attached to said projectiles so as to lift the passenger carried by said support safely out of an aircraft even when travelling at an exceedingly high speed.

7. A motive power device for aircraft personnel catapults, said device including, two pairs of gastight axially-slidable gun barrels, the components of each pair having interengagement with each other when the barrels are extended to their greatest length to prevent detachment of said gun barrels from one another, two elongated hollow members each mounted pistonwise in a corresponding one of the inner of said gun barrels and slidable therein, a manifold joining said hollow members to form a continuous chamber therewith, an explosive charge contained within said manifold and arranged to furnish a force for propelling said members out of said gun barrels upon explosion of said charge, and a firing pin manually operable to explode said charge.

8. An explosion-powered catapult for safely ejecting from an aircraft a passenger travelling therein, including: two series of concentric, inseparable, extensible gun barrels; two cylindrically shaped hollow projectiles each axially slidable and expellable from the corresponding innermost of said two series of barrels, each unit of gun-barrel and projectile defining between those parts a space which is substantially gas tight until the projectiles emerge from the gun barrels; a manifold connecting said hollow projectiles; an explosive charge carried within said manifold; a firing pin also carried within said manifold and movable into engagement with said explosive charge to ignite it; and a lanyard having one end connected to said firing pin and the other end connected to the aircraft's canopy so that removal of the canopy causes the lanyard to be given a jerking movement that activates the firing pin.

9. An escape device for an aircraft, including, a gun having a bifurcated barrel each portion of which comprises two longitudinally extensible parts, interengaging stops limiting the disengaging movement of the parts of said barrel, a pair of elongated projectiles, one for each portion of the bifurcated barrel and normally located in the inner of said barrel parts so as to define therewith an explosion-proof chamber-enclosing casing, a cartridge of explosive located in said chamber and arranged so that upon explosion it expels said projectiles from both of said barrel portions, and a personnel seat connected to said projectiles and movable from said aircraft upon expulsion of the projectiles from said bifurcated barrel.

10. In an aircraft, a fuselage, a seat member movably mounted therein, an elongated bifurcated hollow piston connected to said seat member, two pairs of relatively slidable and mutually inseparable cylinder members each pair of which normally surrounds a corresponding arm of the bifurcated piston, and a firing device for igniting a charge of explosive located within the bifurcated piston thereby to drive said piston out of said cylinder members.

11. Apparatus for safe escape from an aircraft, including, a seat normally contained within said aircraft, an elongated bifurcated hollow piston connected to said seat, two cylinders each one mating with a corresponding portion of said bifurcated piston in conventional piston-cylinder relationship and each formed of two axially-slidable tubular portions having interengaging stops thereon limiting the separating longitudinal movement thereof, a firing device for denotating a charge located within the bifurcated piston and there operable to furnish an eruptive blast for expelling said piston from said cylinders, and a safety member normally holding said firing device against operative movement.

12. In an expansible chamber gun type of safety ejector for occupants of aircraft, a support for a passenger in said aircraft, a manifold mounted on the aircraft fuselage adjacent the base of said support, a pair of elongated hollow pistons one on either side of said support and joined with said manifold, a pair of inner cylinders each slidably surrounding a corresponding one of said pistons and having transversely enlarged portions at their ends furthest from said manifold, a pair of outer cylinders attached to said support and slidably surrounding said inner cylinders, each having closed its end furthest from said manifold and having a transversely reduced portion arranged for engagement with the enlarged portions of said inner pistons when said inner cylinders are in axially extended position, means removably attached to said outer cylinders and to said aircraft for maintaining those cylinders in such a position that any force simultaneously exerted lengthwise along them both would cause the force to act through the substantial center of gravity of the support and passenger thereon, and an explosive charge contained within said manifold and adapted, upon explosion, to move said cylinders into axially extended interengaging position and to expel said pistons from said cylinders and to carry away the support and cylinders attached thereto so as to lift the passenger carried by said support safely out of an aircraft even when travelling at an exceedingly high speed.

13. In an aircraft, a fuselage, a seat member movably mounted therein, a pair of outer hollow cylinders connected on opposite sides to said seat member, a pair of inner hollow cylinders slidably but inseparably carried by said outer cylinders, a bifurcated hollow piston secured to said fuselage so that each branch of the piston is slidably encircled by said cylinders, and a firing device for igniting a charge of explosive located within the bifurcated piston thereby to drive said cylinders and attached seat member off the piston and out of said aircraft.

14. Apparatus for safe escape from an aircraft, including, a seat normally contained within said aircraft, an elongated bifurcated hollow piston connected to said aircraft adjacent the base of said seat, two cylinders each one connected to opposite sides of said seat and associated with a corresponding portion of said bifurcated piston and each formed of two axially-slidable tubular portions having inter-engaging stops thereon limiting the separating longitudinal movement thereof, a firing device for detonating a charge located within the bifurcated piston and there operable to furnish an eruptive blast for expelling said cylinders off of said piston, and a safety member normally holding said firing device against operative movement.

15. In an ejecting device for the safe removal of personnel from an aircraft; a chair; a supporting frame therefor comprising two hollow cylinders each attached to the aircraft fuselage on opposite sides of said chair; a pair of pistons each slidably mounted in a corresponding one of said cylinders; gas-sealing helical springs fitted into and anchored in accommodating grooves therefor which encircle the exterior surface of said pistons; a manifold, to which said pistons are joined, attached to the top of the chair; and an explosive charge located in said manifold and arranged to furnish the ejecting force when exploded.

16. In an ejecting device for the safe removal of personnel from an aircraft; a chair; a supporting frame therefor comprising two hollow cylinders each attached to opposite sides of said chair; a pair of pistons each slidably mounted in a corresponding one of said cylinders; gas sealing helical springs fitted into and anchored in accommodating grooves therefor which encircle the exterior surface of said pistons; a manifold, to which said pistons are joined, attached to the aircraft fuselage at the base of the chair; and an explosive charge located in said manifold and arranged to furnish the ejecting force when exploded.

CLARENCE WALTON MUSSER.

REFERENCES CITED

The following references are of record in the file of this patent:

UNITED STATES PATENTS

| Number | Name | Date |
|---|---|---|
| 56,699 | Cameron | July 31, 1866 |
| 2,168,094 | Cozzitorto | Aug. 1, 1939 |
| 2,459,948 | Lobelle | Jan. 25, 1949 |
| 2,467,763 | Martin | Apr. 19, 1949 |
| 2,489,984 | Shoemaker | Nov. 29, 1949 |